United States Patent
Antemijczuk et al.

(10) Patent No.: US 11,509,766 B2
(45) Date of Patent: Nov. 22, 2022

(54) METHOD AND SYSTEM TO SEAMLESSLY UPGRADE AUDIO SERVICES

(71) Applicant: MOTOROLA SOLUTIONS, INC., Chicago, IL (US)

(72) Inventors: Pawel Antemijczuk, Soborg (DK); Djamel Ouerdane, Frederiksberg (DK); Fernando Casanova Galeano, Greve (DK)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 250 days.

(21) Appl. No.: 17/101,318

(22) Filed: Nov. 23, 2020

(65) Prior Publication Data

US 2022/0166874 A1 May 26, 2022

(51) Int. Cl.
*H04M 3/42* (2006.01)
*H04M 3/56* (2006.01)

(52) U.S. Cl.
CPC ... *H04M 3/42144* (2013.01); *H04M 3/42178* (2013.01); *H04M 3/568* (2013.01)

(58) Field of Classification Search
CPC ....... H04L 67/125; H04L 41/12; H04L 67/10; H04L 61/256; H04L 63/166; H04W 4/70; G06F 17/241; G06F 11/3433; G06F 9/451
USPC .......................................... 455/419; 370/331
See application file for complete search history.

(56) References Cited

U.S. PATENT DOCUMENTS

| | | | |
|---|---|---|---|
| 7,831,974 B2 | 11/2010 | Huston et al. | |
| 9,229,707 B2 | 1/2016 | Borissov et al. | |
| 2005/0262254 A1 | 11/2005 | Sherwani | |
| 2009/0089813 A1 | 4/2009 | Wihardja et al. | |
| 2020/0099655 A1* | 3/2020 | Mosko | H04L 41/0266 |
| 2021/0224178 A1* | 7/2021 | Singh | G06F 9/44505 |

FOREIGN PATENT DOCUMENTS

| | | |
|---|---|---|
| JP | 5571667 B2 | 8/2014 |
| WO | 2002044835 A2 | 6/2002 |

OTHER PUBLICATIONS

Wikipedia: "Service satelessness principle", https://en.wikipedia.org/wiki/Service_statelessness_principle, downloaded from the internet: Oct. 26, 2020, all pages.

* cited by examiner

*Primary Examiner* — Phuoc H Doan
(74) *Attorney, Agent, or Firm* — Barbara R. Doutre; John MacIntyre

(57) ABSTRACT

A method and system to preserve group call audio during a cloud-based group call service upgrade are provided. Audio duplication requests are received and managed through a message broker and instances of an audio distribution service. When a determination is made that an audio distribution service needs to be upgraded, the group call is preserved by generating new instances of the audio distribution service. The new instances of the audio distribution service are added to a queue of the message broker, and old instance of the audio duplication service are gracefully shutdown. Each new instance of the audio distribution service is used to route an audio stream associated with each of the original audio duplication requests, while the olds instances of the audio duplication service are being gracefully shutdown.

20 Claims, 4 Drawing Sheets

METHOD AND SYSTEM TO SEAMLESSLY UPGRADE AUDIO SERVICES

BACKGROUND OF THE INVENTION

Communication systems provide communication between users on the system. Loss of service for a user is bothersome and frustrating. In the case where the communication system is a public safety communication system, loss of service can be even more problematic, as group calls may be negatively impacted. There are situations when core network equipment needs to be upgraded. In current land mobile communication systems this can only be done in a manner in which a temporary loss of service and loss of ongoing calls occurs. Therefore a need exists for a method and system to provide the ability to upgrade network components in a land mobile radio system with zero downtime to avoid loss of service and loss of ongoing calls.

BRIEF DESCRIPTION OF THE SEVERAL VIEWS OF THE DRAWINGS

In the accompanying figures similar or the same reference numerals may be repeated to indicate corresponding or analogous elements. These figures, together with the detailed description below, are incorporated in and form part of the specification and serve to further illustrate various exemplary embodiments of concepts that include the claimed invention, and to explain various principles and advantages of those exemplary embodiments.

Figure 1:
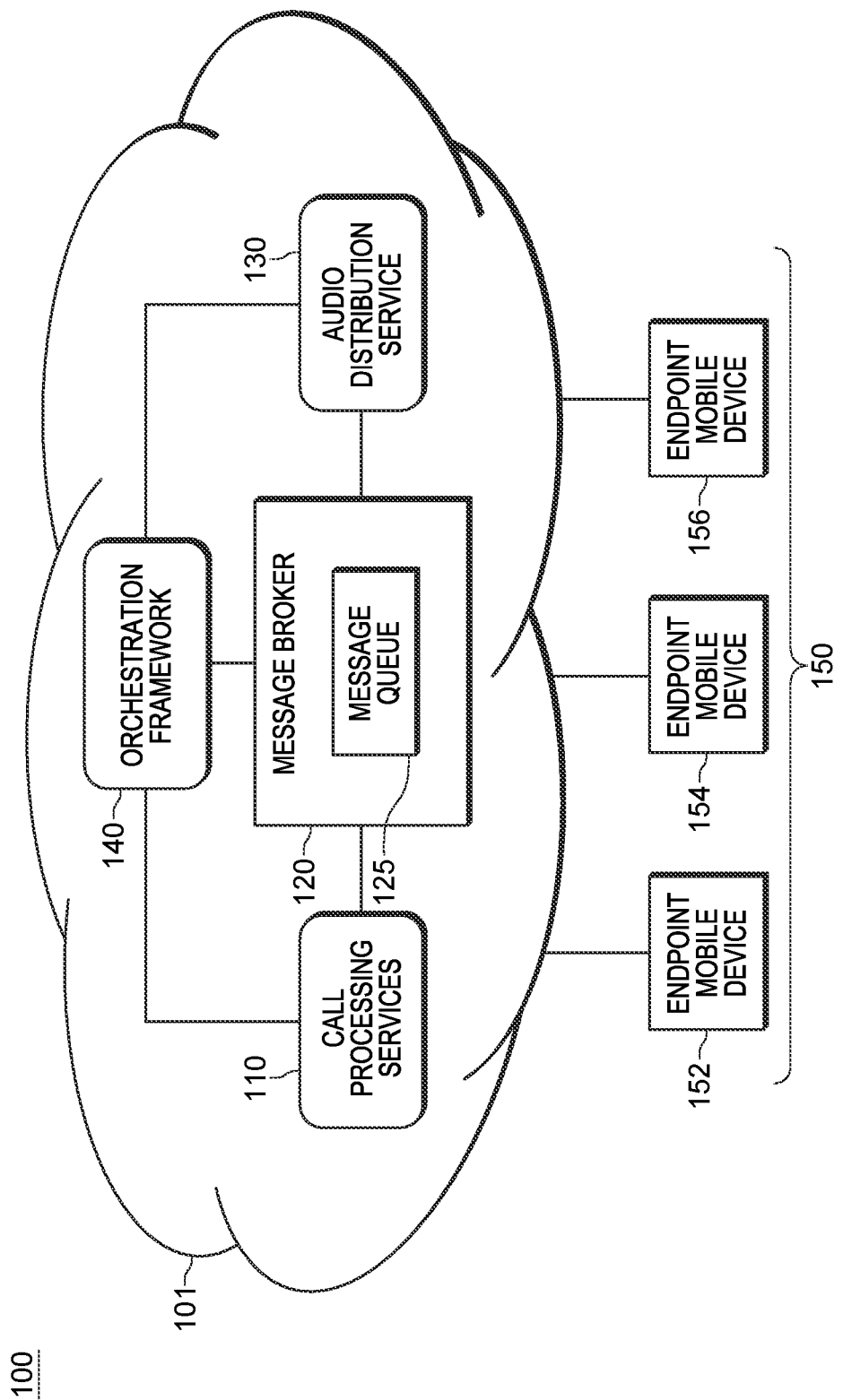
FIG. 1 is a block diagram of communication system in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help improve understanding of embodiments of the present disclosure.

The apparatus and method components have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

DETAILED DESCRIPTION OF THE INVENTION

A method and system to preserve group call audio during a cloud-based group call service upgrade are provided. Briefly, audio duplication requests are received and managed through a message broker and instances of an audio distribution service. When a determination is made that an audio distribution service needs to be upgraded, the group call is preserved by generating new instances of the audio distribution service. The new instances of the audio distribution service are added to a queue of the message broker, and old instances of the audio duplication service are gracefully shutdown. Each new instance of the audio distribution service is used to route an audio stream associated with each of the original audio duplication requests, while the olds instances of the audio duplication service are being gracefully shutdown FIG. 1 is a block diagram of a communication system 100 formed and operating in accordance with some embodiments. Communication system 100 comprises cloud based call processing services 110, a message broker 120 with message queue 125, and a plurality of audio distribution services 130, all operating under a cloud based orchestration framework 140 and enabling communication with one or more endpoint devices 150, for example endpoint mobile devices 152, 154, 156. For group call, at least one endpoint, such as endpoint 152 may be a source endpoint that generates an audio stream, while endpoints 154, 156 are termination endpoints for receiving the audio stream.

The communication system 100 operates over radio frequency (RF) communications. The type of RF communications can vary, and can include an RF system of a single type or any combination of compatible RF systems. For example in FIG. 1, communication system 100 may be a land mobile radio (LMR) digital two-way radio communications system. LMR systems are well suited to operation in public safety environments, such as law enforcement, fire and/or medical rescue where maintaining group call communications and avoiding dropped communications to endpoint mobile devices 150 during service upgrades is extremely desirable. LMR systems operate mission critical voice and data in the 700 MHz, 800 MHz, 900 MHz, UHF and VHF bands for voice and data operation. While extremely desirable for service upgrades taking place during talkgroup applications in LMR systems, the improved upgrade capability provided by the embodiments may also be applied to other systems such as long term evolution (LTE) systems that provide broadband access and group call services to subscriber endpoint devices.

Operating within cloud 101, the processing services 110 are responsible for coordinating the start, maintenance and termination of group calls amongst endpoint devices 150. The message broker 120 is a logical entity that maintains a set of queues 125, each queue storing requests to a given service, which for the purposes of this application are audio duplication requests used in a group call. Such audio duplication requests originate from group call requests generated from a source device which are processed through the call processing services 110 and which are then sent as customer requests to the audio distribution service, where such requests become duplication requests stored in queue 125. The orchestration framework 140 is a logical entity that determines whether any service within cloud 101 must be upgraded, or simply redeployed elsewhere within the cloud infrastructure. Such upgrades may now advantageously take place during a group call, without negatively impacting the call.

For a newly started group call, call processing services 110 are responsible for checking the validity of a user and group IDs, determining whether the user and the group are allowed to perform the requested talk group operation, finding all endpoints 152, 154, 156 that need to be involved in the call, determining that sufficient resources are available at those endpoints to receive the call, sending the needed signaling to the endpoints, and sending audio duplication requests to the message broker 120.

For an already ongoing call, call processing services 110 are responsible for checking whether new call requests can interrupt any ongoing audio, updating the endpoints that have to participate in the call when users change affiliated talkgroup, sending the needed signaling to the endpoints, and sending the needed signaling to the endpoints, and sending audio duplication requests to the message broker 120.

Operationally, during the establishment of a group call (new group call or ongoing call) by call processing services 110, an audio distribution service 130 is informed as to source and destination endpoints for the call. The audio duplication requests are sent by the message broker 120, in a round robin fashion, to instances of audio distribution services 130. Upon receiving an audio duplication request from the message broker 120, each instance of audio distribution establishes an internal audio duplicator process. The audio duplicator process informs the source endpoint as to the audio distribution service's own IP address and port so that the source endpoint, such as endpoint 152, can send audio packets to the audio duplicator process associated with that instance. The audio distribution service 130 receives a source audio stream from the source endpoint, and the audio distribution process duplicates every audio packet for relaying to termination endpoints, such as endpoints 154, 156, thereby establishing the group call. In accordance with the embodiments to be described herein communication system 100 operates in a manner that preserves the group call audio amongst endpoint devices 150 during a cloud-based group call service upgrade.

In accordance with the embodiments, communication system 100 preserves group call audio (new group call or ongoing group call) during a cloud-based group call service upgrade, via the message broker 120 and audio distribution services 130. Briefly, a determination is made, by the orchestration framework 140, that an upgrade to the audio distribution service is needed which starts new instances of the audio distribution service 130, where each new instance of the audio distribution service has its own duplicator processes. The new instances of audio distribution service join the round robin queue on the message broker 120. The message broker 120 now advantageously controls the re-establishment of the audio stream routing through the new instances of the of the audio distribution service to the endpoints 150. Old instances of the audio distribution service are terminated by the orchestration frame work 140 in a graceful manner, so as to maintain group call.

The termination of old instances of the audio distribution service is controlled by exit signals sent from the orchestration frame work 140 to the old instances. The exit signals are sent in response new instances of the audio distribution service reporting to the orchestration frame work 140 that they are operational, thereby allowing for a graceful shutdown of old instances. During graceful shutdown, the audio distribution service is considered an old instance of audio distribution service. Internal processes of the old instances of audio distribution service are notified of the shut down so that the old instances will cease to consume new requests. The shutdown notifications also cause the old instances of audio distribution service to forward original requests to the message broker for requeuing, and processing by the new instances. Hence, an audio stream is routed through a new instance of audio distribution service. After a predetermined grace time has passed, any old instances of the audio distribution service that have not stopped running will be shut down.

Figure 2:
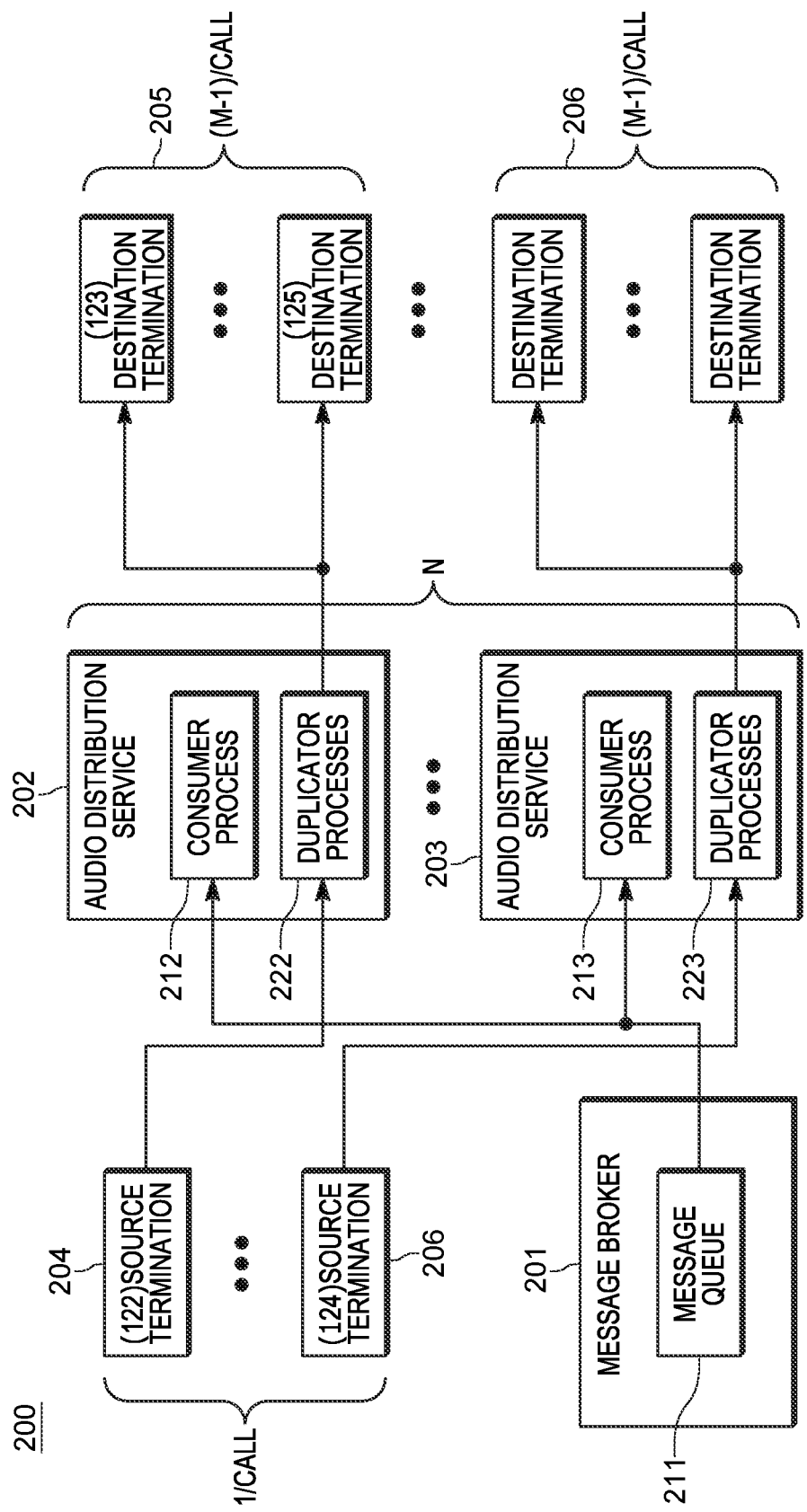
FIG. 2 is a more detailed view of the audio distribution service of FIG. 1 in accordance with some embodiments.

FIG. 2 is a more detailed view 200 of the audio distribution portion of system 100 in accordance with some embodiments. The system comprises a message broker 201, N-identical instances of audio distribution services 202, 203, and M audio terminations 204, 205, 206 per call (with one source termination 204 for M−1 destination terminations 205, 206).

Each audio termination 204, 205, 205 comprises an IP address and a port. Each audio distribution service 202, 203 receives a source audio stream (one audio stream per duplicator process), and each duplicator process duplicates every audio packet into M−1 destination streams for its respective audio stream. The instances of the audio distribution service 202, 203 share a single message queue 211 defined in the message broker 201. Each audio distribution service 202 and 203 respectively includes a consumer process 212, 213 and duplicator processes 222, 223. The consumer processes 212, 213 process audio duplication requests, and the duplicator processes 222, 223 duplicate audio resource packets from source termination 204 for handling the request. The plurality of audio distribution services 202 and 203 are preferably identical instances operating as part of a container orchestration framework, such as a Kubernetes framework, that allows application services to be built that span multiple containers without the need for manual deployment of applications.

In operation, the cloud based call processing services, such as 110 of FIG. 1, send audio duplication requests to the message broker 201. The instances of audio distribution service 202, 203 are informed by call processing services 110 as to which audio terminations are source terminations 204 and which audio terminations are destination terminations 205, 206 for each request. The instances of audio distribution service 202, 203 receive their respective audio duplication request from the message broker 201 through their respective consumer process 212, 213, which sets up their respective duplicator processes 222, 223 to duplicate audio resource packets from source termination 204 for handling the request.

In accordance with some embodiments, the orchestration framework determines when the audio distribution service needs to be upgraded. When an upgrade is determined to be needed, new instances of the audio distribution service are added to the queue 211, of message broker 201, as the old instances of the audio distribution service are detached from the queue and terminated using exit signals originating from the orchestration framework. Each new instance of the audio distribution service has a new audio duplicator process for processing an audio duplication request. The new audio duplicator process notifies the source termination 204 as to the new IP address and port associated with the new instance of audio distribution service. This notification redirects the audio stream to the new instance of audio distribution service. Once the new instance(s) report being operational, the orchestration framework starts sending exit signals to the old instances thereby shutting them down gracefully. The old instances of audio distribution service that are being shut down detach from the queue and send original duplication requests to the message broker for requeuing. The message broker then transmits those original audio duplication requests to the new instance of the audio distribution service. Hence, each respective audio stream is now routed through a new instance of audio distribution service. The orchestration framework will shut down any remaining old instances after a predetermined grace period of time after the sending of the exit signal. This time allows the old instance to re-transmit the original audio duplication request to the new instance and process any remaining in-flight audio packets until the new instances take over.

Figure 3:
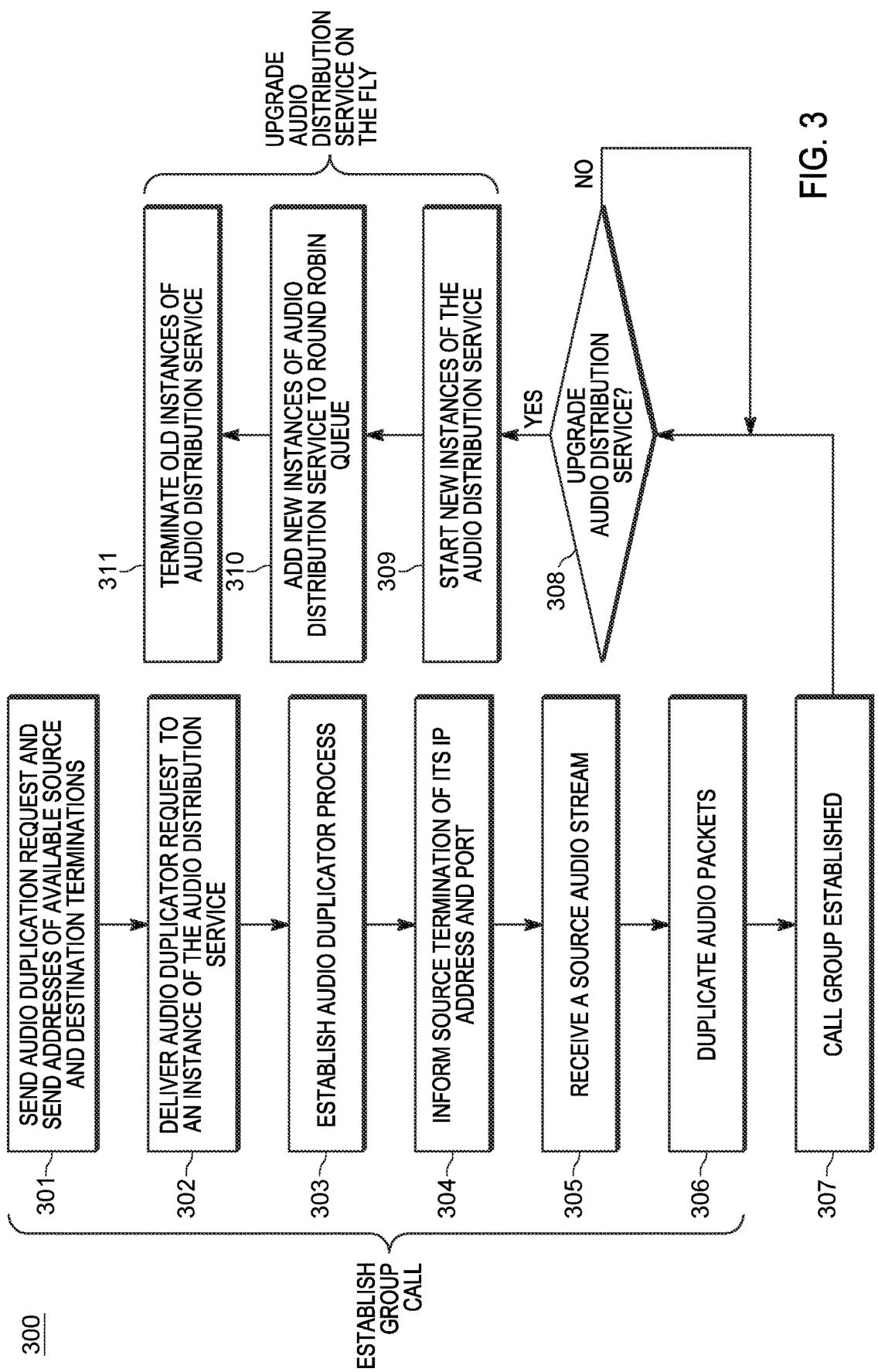
FIG. 3 is a flow chart in accordance in accordance with some embodiments.

FIG. 3 is a flowchart of a method 300 to seamlessly upgrade an LMR cloud based audio distribution service, such as that shown in FIGS. 1 and 2, in accordance with some embodiments. At 301, call processing services send an audio duplication request to the message broker, and the call processing services also send addresses to an instance of audio distribution service as to available source and destination terminations. The message broker delivers, at 302, the audio duplication request to the instance of audio distribution service, the audio distribution service establishing an audio duplicator process in response thereto at 303.

The audio distribution service informs the source termination, as to its IP address and port, at 304. The IP address is associated with the audio distribution service and the port is associated with its internal audio duplicator process. This establishes routing of audio packets from the source to the audio distribution service. The audio distribution service receives, at 305, a source audio stream from the source termination. The audio distribution service duplicates every audio packet, at 306, through the audio duplicator process based on the number of destination terminations, since the source termination does not need to receive a copy of the audio packet it originated. The duplicated packets are routed through to destination terminations thereby establishing group call at 307.

Now that group call has been established, the ability to preserve that call during upgrades to the audio distribution service is advantageously achieved through the remaining steps of method 300. The orchestration framework determines, at 308, when an upgrade to the audio distribution service is needed. If the audio distribution service needs upgrading, the orchestration framework triggers the audio distribution service to start new instances of the audio distribution service at 309. Each new instance of audio distribution service has its own new IP address and port associated therewith.

The new instances of audio distribution service are added to the round robin queue of the broker, at 310, by the consumer process of each new instance of audio distributions service. The orchestration framework terminates the old (original) instances, at 311, of the audio distribution service. This process is depicted and described in greater detail in conjunction with FIG. 4 of the embodiments.

Figure 4:
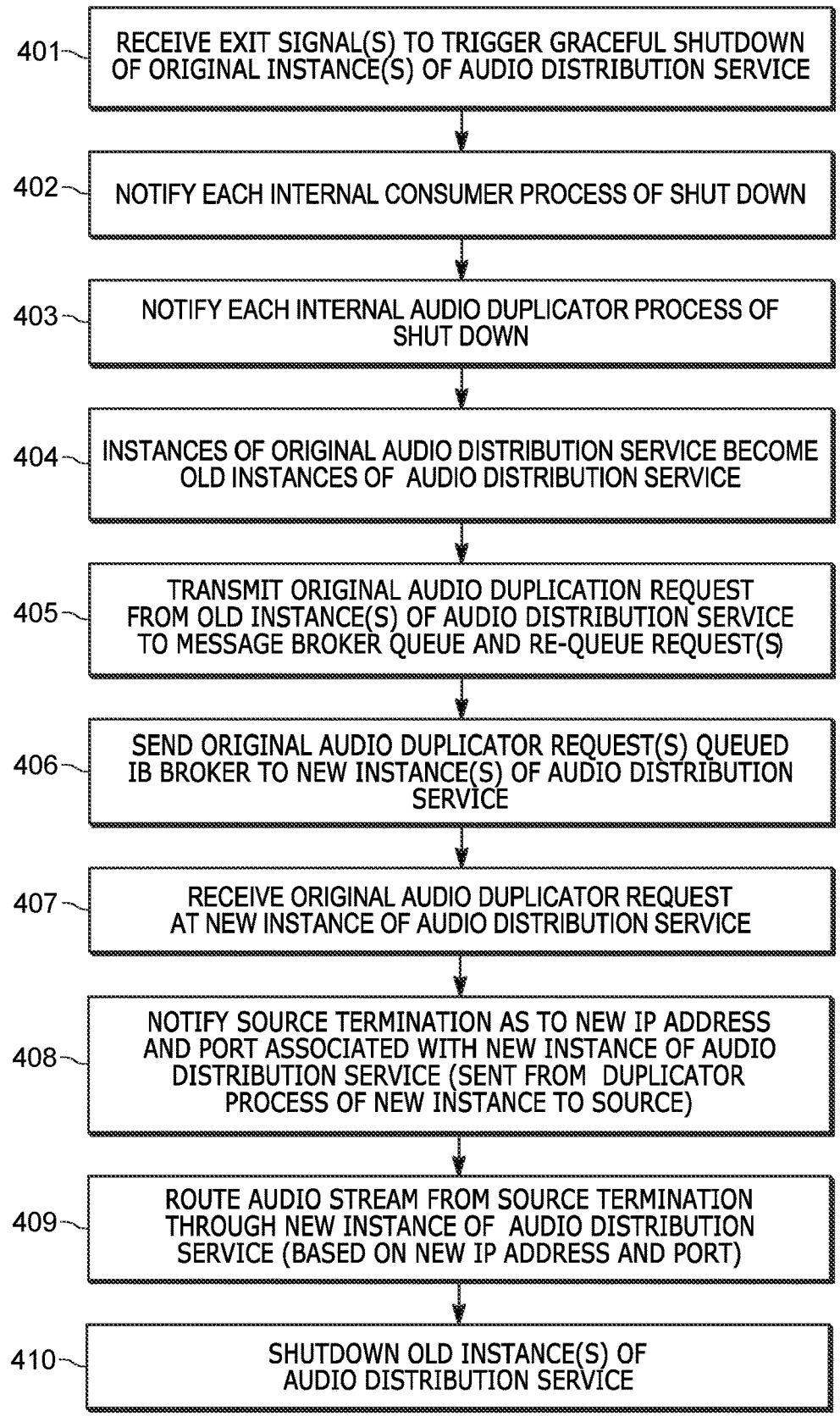
FIG. 4 is another flow chart in accordance in accordance with some embodiments.

FIG. 4 depicts a flowchart of a method 400 for graceful termination of old instance(s) of the audio distribution service, in accordance with some embodiments. At 401, the message broker receives an exit signal from the orchestration framework indicating that an old instance of the audio distribution service should be shut down. The message broker sends the shutdown notification to the internal consumer process of the old instance at 402. The shutdown notification indicates to the internal consumer process of the old instance that it will cease to consume new requests. The internal consumer process then forwards, at 403, the shutdown notification to the internal audio duplicator process of the old instance, which in turn triggers that audio duplicator process to send the original audio duplication request to the message broker for requeuing.

At 406, the broker sends the requeued original audio duplicator request to the new instance of audio distribution service. At 407, the new instance of audio distribution service receives the original audio duplication request as a new request from the message broker. In response to receiving the request, the new instance of audio distribution service notifies, at 408, the source termination as to the new IP address and port associated with the new instance of audio distribution service. In accordance with some embodiments, this notification causes the source termination to redirect the audio stream, at 409, through the new instance of audio distribution service. The message broker finally shuts down the old instance of the audio distribution service, at 410. Hence, the audio stream has been advantageously redirected prior to the complete shutdown of the old instance of audio distribution service thereby avoiding audio holes and preserving the group call.

Accordingly, there has been provided a method and system to preserve group call audio during a cloud-based group call service upgrade. The method and system can be summarized by: receiving an audio duplication request at an audio distribution service from a message broker; routing an audio stream through the audio distribution service; determining that the audio distribution service needs to be upgraded; starting a new instance of the audio distribution service; adding the new instance of audio distribution service to a queue of the message broker; beginning graceful shutdown of the audio distribution service as an old audio distribution service; routing the audio stream through the new instance of audio distribution; and terminating the old audio distribution service.

As should be apparent from this detailed description, the operations and functions of the electronic computing device are sufficiently complex as to require their implementation on a computer system, and cannot be performed, as a practical matter, in the human mind. Electronic computing devices such as set forth herein are understood as requiring and providing speed and accuracy and complexity management that are not obtainable by human mental steps, in addition to the inherently digital nature of such operations (e.g., a human mind cannot interface directly with RAM or other digital storage, cannot transmit or receive electronic messages, electronically encoded video, electronically encoded audio, etc., and cannot send unicast messages to each of the talkgroup members connected to a broadband network, among other features and functions set forth herein).

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element preceded by "comprises . . . a", "has . . . a", "includes . . . a", "contains . . . a" does not, without more constraints, preclude the existence of additional identical elements in the process, method, article, or apparatus that comprises, has, includes, or contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "one of", without a more limiting modifier such as "only one of", and when applied herein to two or more subsequently defined options such as "one of A and B" should be construed to mean an existence of any one of the options in the list alone (e.g., A alone or B alone) or any combination of two or more of the options in the list (e.g., A and B together).

A device or structure that is "configured" in a certain way is configured in at least that way, but may also be configured in ways that are not listed.

The terms "coupled", "coupling" or "connected" as used herein can have several different meanings depending in the context in which these terms are used. For example, the terms coupled, coupling, or connected can have a mechanical or electrical connotation. For example, as used herein, the terms coupled, coupling, or connected can indicate that two elements or devices are directly connected to one another or connected to one another through an intermediate elements or devices via an electrical element, electrical signal or a mechanical element depending on the particular context.

It will be appreciated that some embodiments may be comprised of one or more generic or specialized electronic processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising an electronic processor) to perform a method as described and claimed herein. Any suitable computer-usable or computer readable medium may be utilized. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory), and a Flash memory. In the context of this document, a computer-usable or computer-readable medium may be any medium that can contain, store, communicate, propagate, or transport the program for use by or in connection with the instruction execution system, apparatus, or device.

Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation. For example, computer program code for carrying out operations of various example embodiments may be written in an object oriented programming language such as Java, Smalltalk, C++, Python, or the like. However, the computer program code for carrying out operations of various example embodiments may also be written in conventional procedural programming languages, such as the "C" programming language or similar programming languages. The program code may execute entirely on a computer, partly on the computer, as a stand-alone software package, partly on the computer and partly on a remote computer or server, or entirely on the remote computer or server. In the latter scenario, the remote computer or server may be connected to the computer through a local area network (LAN) or a wide area network (WAN), or the connection may be made to an external computer (for example, through the Internet using an Internet Service Provider).

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as separately claimed subject matter.

We claim:

1. A method to preserve group call audio during a cloud-based group call service upgrade, the method comprising:
   receiving an original audio duplication request at an audio distribution service from a message broker;
   routing an audio stream, from a source termination, through the audio distribution service;
   determining that the audio distribution service needs to be upgraded;
   starting a new instance of the audio distribution service;
   adding the new instance of audio distribution service to a queue of the message broker;
   beginning a graceful shutdown of the audio distribution service as an old instance of audio distribution service;
   routing the audio stream through the new instance of audio distribution service; and
   terminating the old instance of audio distribution service.

2. The method of claim 1, wherein beginning a graceful shutdown further comprises:
   receiving an exit signal, at the message broker, indicative of the need for a shutdown.

3. The method of claim 2, wherein beginning the graceful shutdown further comprises:
   sending a shutdown notification, by the message broker, to an internal consumer process of the old instance of audio distribution service.

4. The method of claim 3, wherein the shutdown notification indicates to the internal consumer process to cease consuming audio duplication requests.

5. The method of claim 4, further comprising:
forwarding the shutdown notification, from the internal consumer process, to an internal audio duplicator process of the old instance of audio distribution service.

6. The method of claim 5, further comprising:
sending the original audio duplication request, from the audio duplicator process, to the message broker for requeuing.

7. The method of claim 6, further comprising:
sending the requeued original audio duplicator request, from the message broker, to the new instance of audio distribution service.

8. The method of claim 7, further comprising:
receiving the original audio duplication request as a new request at the new instance of audio distribution service.

9. The method of claim 8, further comprising:
notifying the source termination of an IP address and port associated with the new instance of audio distribution service, thereby redirecting the audio stream from the source through the new instance of audio distribution service.

10. The method of claim 9, further comprising:
shutting down the old instance of audio distribution service.

11. A communication system for preserving group call audio during a cloud-based group call service upgrade, the communication system comprising:
a message broker;
an audio distribution service configured to:
  receive an original audio duplicator request from the message broker;
  route an audio stream from a source termination through the audio distribution service;
  determine that the audio distribution service needs to be upgraded;
  start a new instance of the audio distribution service;
  add the new instance of the audio distribution service to a queue of the message broker;
  begin a graceful shutdown of the audio distribution service as an old instance of audio distribution service;
  rout the audio stream through the new instance of audio distribution service; and
  terminate the old instance of audio distribution service.

12. The communication system of claim 11, wherein the message broker receives an exit signal indicative of the need for a shutdown.

13. The communication system of claim 12, wherein the message broker sends a shutdown notification to an internal consumer process of the old instance of audio distribution service.

14. The communication system of claim 13, wherein the shutdown notification indicates to the internal consumer process to cease consuming audio duplication requests.

15. The communication system of claim 14, wherein the internal consumer process forwards the shutdown notification to an internal audio duplicator process of the old instance of audio distribution service.

16. The communication system of claim 15, wherein the internal audio duplicator process sends the original audio duplication request to the message broker for requeuing.

17. The communication system of claim 16, wherein the requeued original audio duplicator request is sent from the message broker to the new instance of audio distribution service.

18. The communication system of claim 17, wherein the new instance of audio distribution service receives the original audio duplication request as a new request from the message broker.

19. The communication system of claim 18, wherein, in response to receiving the new request, the new instance of audio distribution service notifies the source termination as to an IP address and port associated with the new instance of audio distribution service, thereby redirecting the audio stream from the source termination through the new instance of audio distribution service.

20. The communication system of claim 19, wherein the old instance of audio distribution service is shutdown.

* * * * *